United States Patent [19] [11] 3,916,673
Gass et al. [45] Nov. 4, 1975

[54] SYSTEM FOR NONDESTRUCTIVELY TESTING VESSELS

[75] Inventors: Edward W. Gass; Robert J. Guest, both of Duncan, Okla.

[73] Assignee: Halliburton Company, Duncan, Okla.

[22] Filed: May 19, 1972

[21] Appl. No.: 254,997

Related U.S. Application Data

[63] Continuation of Ser. No. 55,481, July 16, 1970, abandoned.

[52] U.S. Cl. ................................. 73/37; 73/49.5
[51] Int. Cl.² ................................. G01M 5/00
[58] Field of Search .............. 73/37, 37.5, 49.5

[56] References Cited
UNITED STATES PATENTS 3,230,760  1/1966  Fryer ........................... 73/49.2
3,365,933  1/1968  Jurgensen ..................... 73/37
3,555,881  1/1971  Ayers ........................... 73/37

Primary Examiner—Richard C. Queisser
Assistant Examiner—Denis E. Corr
Attorney, Agent, or Firm—Floyd A. Gonzalez; L. Lawton Rogers, III; John H. Tregoning

[57] ABSTRACT

A system for nondestructively testing elastically and plastically deformable vessels, particularly pipelines to determine the "yield" characteristics thereof, particularly with respect to a predetermined specified yield or strain point. A deformation computer and a ratio computer are utilized to provide, respectively, continuous indications of the amount of plastic deformation and the rate of deformation of the vessel during the test.

31 Claims, 6 Drawing Figures

SYSTEM FOR NONDESTRUCTIVELY TESTING VESSELS

This is a continuation, of application Ser. No. 55,481, filed July 16, 1970, now abandoned.

BACKGROUND OF THE INVENTION

The present invention relates to a method and apparatus for non-destructively testing vessels and more particularly relates to a method and apparatus for non-destructively determining the deformation characteristics of elastically and plastically deformable vessels.

In the non-destructive testing of pressure vessels, such as pipelines, the vessel is sealed and a suitable fluid is introduced into the vessel to cause the increasing deformation thereof. Initially, the vessel deforms elastically and a plot of the pressure applied to the interior of the vessel versus the volume of fluid introduced into the vessel will produce a straight line. The relationship between pressure and volume ideally remains linear for a vessel which deforms in an elastic manner. However, when the point on the pressure versus volume curve, commonly referred to as the elastic or proportional limit of the vessel, is reached, the relationship between pressure and volume becomes non-linear and the plot of pressure versus volume deviates from ideal elastic behavior.

In the past, the materials used for pressure vessels, particularly pipelines, had a tendency to plastically deform rather abruptly beyond the elastic limit. Thus, the slope of the pressure versus volume curve exhibited a rather abrupt change which could easily be detected by plotting, for example, on a chart recorder the parameters of pressure versus volume. The abrupt change thus made it feasible to detect the elastic limit point. The pressure required to deform the vessel to its elastic limit could then be determined and a measure of "strength" relative to the elastic limit of the vessel provided.

The pressure versus volume curve of more recently developed materials used in the manufacture of pipelines and other vessels deviates more gradually from the ideal elastic curve beyond the elastic limit point of the curve when the pipeline is subjected to increasing deformation. Thus, while the deviation from the elastic curve may become appreciable as fluid pressure and volume increase, the slope of the pressure versus volume curve exhibits very little change. It is therefore more difficult to detect the point at which plastic deformation begins, i.e. the elastic limit point. It may be even more difficult when non-destructively testing newer pipelines to determine the extent by which the elastic limit has been exceeded, i.e. the amount of plastic deformation.

The elastic limit point as well as the rate at which the vessel is deforming may be determined by calculating the slope of the pressure versus volume curve. Since the relationship between pressure and volume is linear in the elastic region of the curve, the slope of the curve is constant in this region. However, beyond the elastic limit, i.e. in the plastic region of the curve, the slope of the curve changes. Thus, by calculating the slope of the curve and detecting changes in the slope, the elastic limit and the deformation rate are available.

A measure of the amount of plastic deformation is particularly important where, for example, a pipeline must meet certain "specified minimum yield strength" requirements which are set by statute or by industry specifications. "Specified minimum yield strengths" ordinarily are not referenced to the elastic limit point. More commonly, yield strength is specified in terms of some predetermined percentage of deformation or strain beyond the elastic limit point.

One common method of specifying "yield strength" is to evaluate the pressure applied to the pipeline at a point on the pressure-volume curve where plastic deformation of the pipeline causes the pressure versus volume curve to deviate 0.2%, from the ideal elastic curve. To accurately determine pressure at this point, commonly referred to as the 0.2% offset strain or deformation point, it is necessary to measure the exact difference between the ideal elastic curve and the actual pressure versus volume curve of the pipeline under test to thereby determine the exact amount of plastic deformation of the pipeline.

It is therefore an object of the present invention to provide a novel method and apparatus for accurately non-destructively determining the deformation characteristics of vessels.

It is a further object of the present invention to provide a novel method and apparatus for accurately and rapidly determining the deformation rate and the elastic limit of a vessel subjected to increasing deformation.

It is another object of the present invention to provide a novel method and apparatus for accurately and rapidly determining the amount of plastic deformation of a vessel subjected to increasing deformation.

These and other objects and advantages will become apparent to one skilled in the art to which the invention pertains from a perusal of the detailed description when read in conjunction with the attached drawings.

THE DRAWINGS

DETAILED DESCRIPTION

Figure 1:
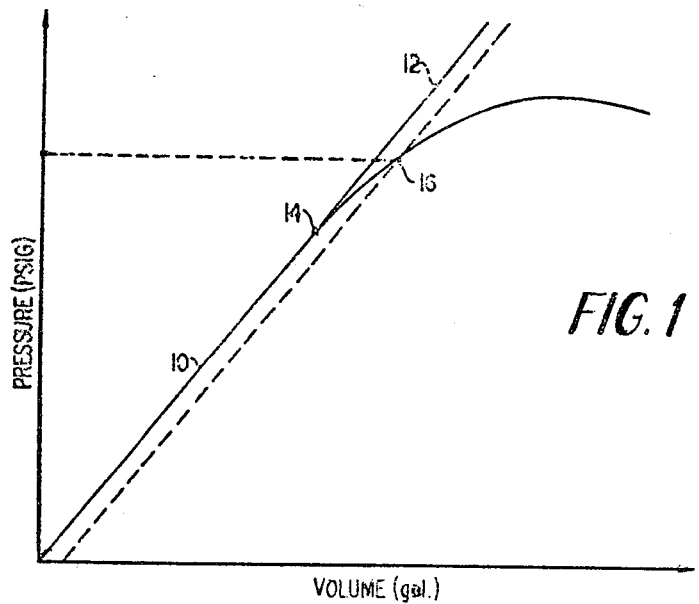
FIG. 1 is a plot of pressure versus volume illustrating the point of plastic deformation.

FIG. 1 is a graph showing a typical plot of pressure versus volume for a pressure vessel subjected to increasing deformation by introducing an increasing volume of fluid into the vessel. Pressure is plotted along the vertical axis and starts at approximately zero gage pressure at the origin. Volume is plotted along the horizontal axis and starts at the origin at an initial volume approximately equal to the volume of the interior of the vessel.

With an incompressible fluid, once the vessel is full, any further introduction of fluid deforms the vessel. Since the vessel is assumed to be both elastically and plastically deformable, the relationship between pressure and volume is initially linear, i.e. elastic, as illustrated by the line 10. Ideally, this linear relationship continues indefinitely as shown by the extension 12 of the line 10. However, an elastic or proportional limit point 14 is reached and the vessel thereafter exhibits plastic behavior.

In the region of plastic deformation beyond the elastic limit 4, the relationship between pressure and volume is non-linear and therefore ordinarily unpredictable. Thus, for a particular vessel it is necessary to empirically determine the "yield strength" of the vessel at a predetermined specified yield condition beyond the elastic limit 4, e.g. the 0.2% offset strain point 16. The non-destructive testing system of the present invention provides this and other test information in a very accurate manner as will be described in connection with FIGS. 2–5 in which like numerical designations have been utilized where appropriate.

Figure 2:
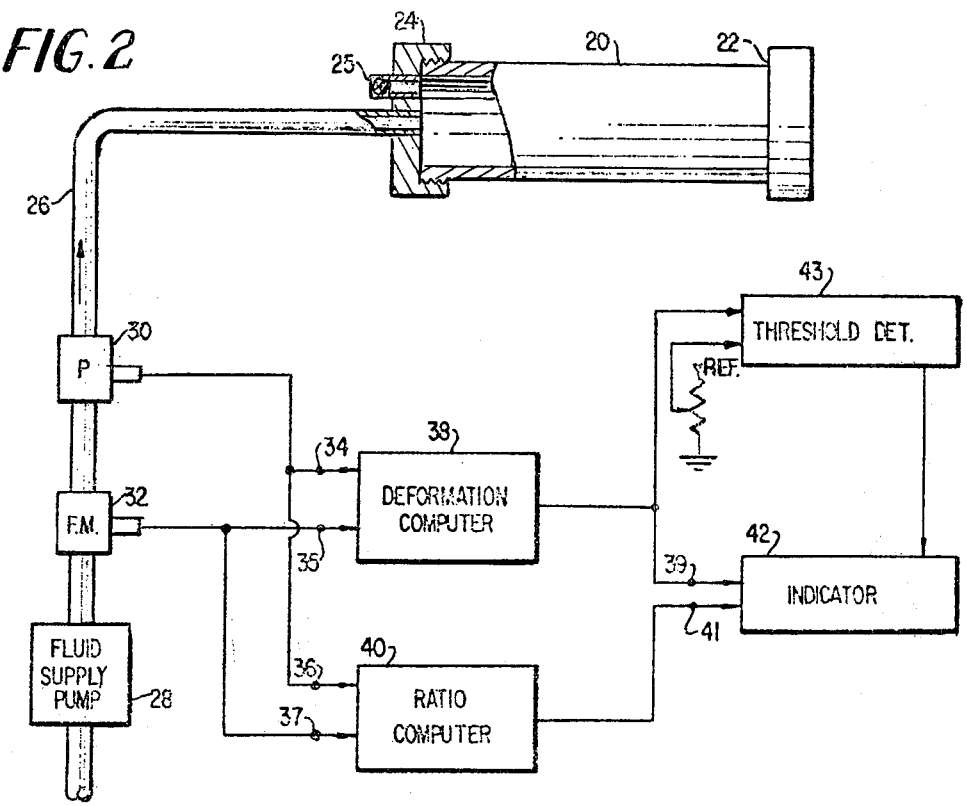
FIG. 2 is a functional diagram of the apparatus of the present inventon.

With reference to FIG. 2 of the drawings, a vessel 20 such as a section of pipeline or other pressure vessel capable of undergoing both elastic and plastic deformation is sealed in a suitable conventional manner, such as by threaded end caps 22 and 24. An air bleed valve 25 may be provided at the point of greatest elevation in the fluid system, e.g. in the end cap 24, to provide a means for filling the vessel entirely with fluid prior to commencing the test. A conduit 26 provides fluid communication between a fluid supply pump 28 and the interior of the vessel 20 to provide a means for introducing fluid into the vessel.

A suitable conventional pressure transducer 30 may be provided at a convenient location in the system to communicate with the interior of the vessel 20 and thereby provide an output signal related to the pressure applied to the interior of the vessel 20 by the fluid. For example, the transducer 30 may be connected in the conduit 26 or alternatively in the end cap 22.

A conventional turbine flowmeter 32 may be provided in the conduit 26 intermediate the fluid supply pump 28 and the vessel 20 to monitor the flow of fluid into the vessel 20. The flowmeter 32 may be a conventional turbine flowmeter which provides a series of pulses which are related in number to the volume of fluid flow therethrough. For example, the flowmeter 32 may provide 1,000 pulses for every gallon of fluid which flows therethrough.

The output signal from the pressure transducer 30 may be applied to an input terminal 34 and 36, respectively, of a deformation computer 38 and a ratio computer 40. The output signal from the flowmeter 32 may likewise be applied to an input terminal 35 and 37, respectively, of the deformation computer 38 and the ratio computer 40. The output signals from the deformation computer 38 and the ratio computer 40 may be applied to the two input terminals 39 and 41 of a conventional indicator 42, e.g. a chart recorder or the like, for visually manifesting the applied signals. In addition, the output signals from the deformation computer 38 and the ratio computer 40 may be applied to a pair of conventional threshold detector circuits 43 (only one shown) to which suitable adjustable reference voltage may be applied, e.g. from a potentiometer. The output signal from the threshold detectors 43 may be applied to suitable indicators or alarms (not shown).

In operation, fluid from the pump 28 is introduced into the interior of the vessel 20 by way of the conduit 26. The air bleed valve 25 remains open until the vessel 20 is completely full, at which time the valve 25 is closed. The flowmeter 32 monitors the flow of fluid into the vessel 20 and provides a flow related electrical signal which is applied to both the deformation computer 38 and the ratio computer 40. The pressure transducer 30 monitors the pressure exerted by the fluid on the interior of the vessel 20 and provides a pressure related electrical signal which is applied to both the deformation computer 38 and the ratio computer 40.

The deformation computer 38 utilizes the pressure related and flow related electrical signals to compute the amount of plastic deformation of the vessel 20, as will be described in connection with FIG. 3. The amount of plastic deformation may be displayed on the indicator 42 to provide an indication of when a specified yield point has been reached or alternatively may be applied to the threshold detector 43 for automatic determination of a specified yield condition.

Figure 3:
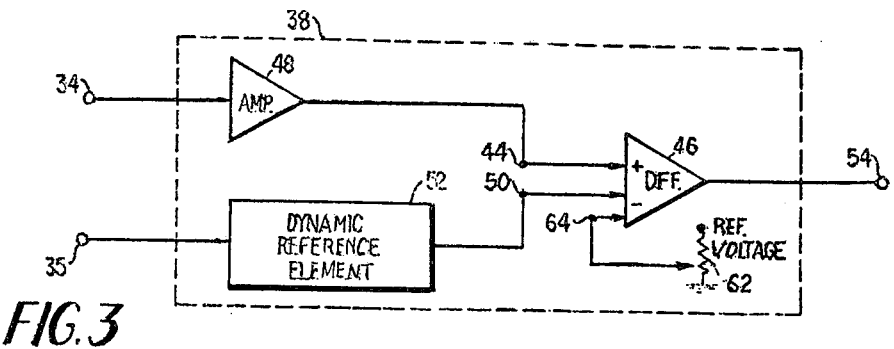
FIG. 3 is a functional block diagram of the deformation computer of FIG. 2.

With reference now to FIG. 3, the pressure related electrical signal from the pressure transducer 30 may be applied to an input terminal 44 of a conventional differential amplifier 46 by way of a conventional amplifier 48. The output signal from the flowmeter 32 may be applied to an input terminal 50 of the differential amplifier 46 by way of a dynamic reference element 52.

The amplifier 48 may be a variable gain, linear amplifier which appropriately scales the pressure related signal from the pressure transducer 30 to provide an output signal related in amplitude to the pressure of the fluid in the vessel 20 of FIG. 1. The desired proportionality between pressure and output signal from the amplifier 48 may be achieved by adjusting the gain of the amplifier 48 in any suitable conventional manner. The signal applied to the input terminal 44 of the differential amplifier 46 is thus related to the instantaneous pressure applied to the interior of the vessel 20.

The dynamic reference element 52 totalizes the flow related electrical signal from the flowmeter 32 to provide a signal related to the total volume of fluid introduced into the vessel 20. The signal related to volume may also be scaled to provide the desired proper proportionality between volume and the volume related signal applied to input terminal 50 of the differential amplifier 46.

Figure 4:
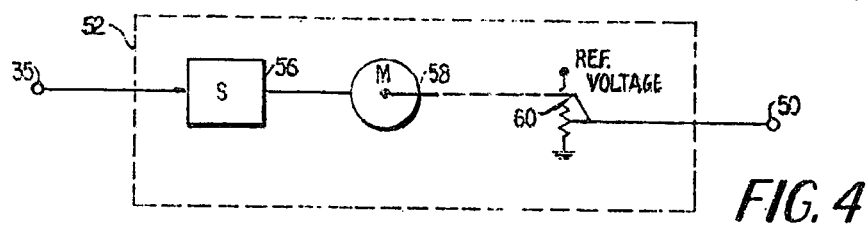
FIG. 4 is a functional block diagram of the dynamic reference element of FIG. 3.

This reference element 52 may conveniently be of the type illustrated in FIG. 4 where the flowmeter 32 pulses applied to terminal 35 are scaled and divided in a conventional scaler 56 and applied to a conventional stepping motor 58. The motor 58 is utilized to drive the arm of a potentiometer 60 thereby varying the signal level on the input terminal 50 of the differential amplifier 46 of FIG. 3 in accordance with the volume of fluid flow.

As the volume of fluid introduced into the vessel 20 increases, the pressure exerted on the vessel by the fluid increases proportionally until the elastic limit point of the vessel is reached. However, the two signals may be offset relative to each other by some initial amount. For example, the volume related electrical signal may reflect the amount of fluid required to fill the vessel initially. The pressure related signal may reflect some initial pressure at the start of the test.

To insure that the volume related signal starts at zero and that the full travel of the potentiometer 60 is available for the test, a disengageable clutch may be provided between the motor 58 and the arm of the potentiometer 60 to set the volume related signal from the potentiometer 60 at zero prior to starting the test. An offset reference potentiometer 62, illustrated in FIG. 3, may be connected to an input terminal 64 of the difference amplifier 46 to correct for any pressure offset.

Thus, when the vessel is full and the potentiometer 60 has been set to zero, the test may be commenced. The offset reference potentiometer 62 may be manually or automatically adjusted initially to provide a zero output signal at the output terminal 54 of the difference amplifier 46 and left at the initial setting throughout the remainder of the test. Since pressure increases proportionally with volume as the vessel elastically deforms, the differential amplifier 46 continues to generate a zero output signal until the elastic limit in reached. Beyond the elastic limit, the volume related electrical signal continues to simulate the ideal elastic deformation of the vessel, while the pressure related electrical signal reflects the actual deformation of the vessel. Since the two signals are no longer proportional beyond this limit point, an output signal representative of the amount of plastic deformation of the vessel is generated by the differential amplifier 46. The output signal from the amplifier 46 may thus provide an indication of when a specified yield point, e.g. the 0.2% offset strain point, has been reached. The test may then be ended at this or any other specified minimum yield strength point and pressure read from an appropriate pressure indicator to provide yield strength data.

Figure 5:
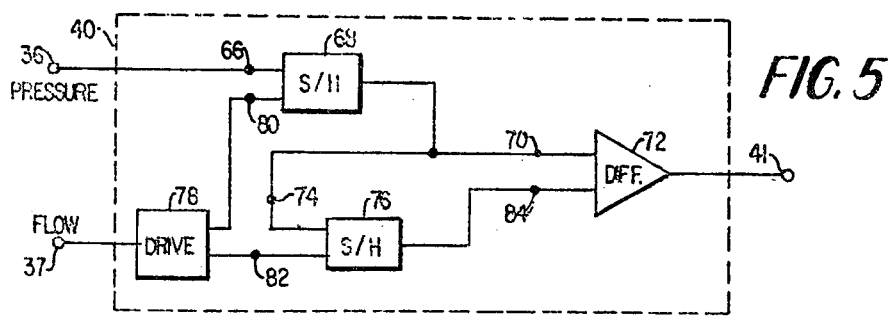
FIG. 5 is a functional block diagram of the ratio computer of FIG. 2.

The ratio computer 40 of the system of FIG. 2 is illustrated in greater detail in FIG. 5. The pressure related electrical signal from the pressure transducer 30 is applied to input terminal 66 of a conventional sample and hold circuit 68, the output signal from which is applied to the input terminal 70 of a conventional differential amplifier 72 and an input terminal 74 of a second conventional sample and hold circuit 76. The output signal from the differential amplifier 72 may then be applied to the input terminal 41 of the indictor 42.

The flow related electrical signal from the flowmeter 32 may be applied to a drive circuit 78 which in turn is connected to an input terminal 80 of the sample and hold circuit 68 and to an input terminal 82 of the sample and hold circuit 76. The output signal from the sample and hold circuit 76 is applied to an input terminal 84 of the differential amplifier 72.

In operation, the pressure related electrical signal is continuously available at the input terminal 66 of the sample and hold circuit 68. The output signal from the sample and hold circuit 68 is continuously available at the input terminal 74 of the sample and hold circuit 76.

A first electrical pulse from the flow meter 32 is applied to the drive circuit 78 and is passed unchanged to the input terminal 82 of the sample and hold circuit 76. The pulse is also delayed for an extremely small time period, e.g. a few nanoseconds, by a conventional delay line in the drive circuit 78 and is applied to the input terminal 80 of the sample and hold circuit 68. Thus, when the pulse from the flowmeter 32 arrives at the drive circuit 78, the sample and hold circuit 76 is gated on and accepts and holds any signal appearing at the input terminal 74 thereof. A few nanoseconds later and after the value in the sample and hold circuit 68 has been transferred to the sample and hold circuit 76, the sample and hold circuit 68 is gated on and accepts and holds any signal appearing at the input terminal 66. The signal stored or held by the sample and hold circuits 68 and 76 are compared by the differential amplifier 72 and the difference signal generated is applied to the output terminal 41.

As more fluid is pumped into the vessel, values of the pressure related signal are sampled and held as described above at intervals which are established by the electrical pulses from the flowmeter 32 and are therefore related to successive equal increments of volume. For example, if the increments between successive pulses from the flowmeter 32 is equal to one gallon of fluid, the pressure related electrical signal is sampled each time one gallon is introduced into the vessel 20. Since the current value of the pressure related signal is stored by the sample and hold circuit 68 and the immediately previous value of the pressure related signal is stored by the sample and hold circuit 76, and since both of these values are related to an incremental change in volume, the output signal from the difference amplifier 72 represents the rate of change of pressure with respect to a unit or increment of volume. This may be expressed as $dP/dV$.

This relationship between pressure and volume represents the slope of the pressure versus volume curve of FIG. 1. Thus, the output signal from the differential amplifier 72 will be some constant while the vessel is elastically deforming and will then change in a decreasing direction when the elastic limit point of the vessel is reached. By providing appropriate scaling (not shown) between the flowmeter 32 and the drive circuit 78, any desired sampling rate may be selected. Thus, an extremely accurate indication of the slope of the pressure-volume curve may be provided. As previously described in connection with FIG. 2, the slope related electrical signal may be utilized to provide a display of $dP/dV$ or may be utilized by the threshold detector 43 to automatically provide an indication of a slope change.

Figure 6:
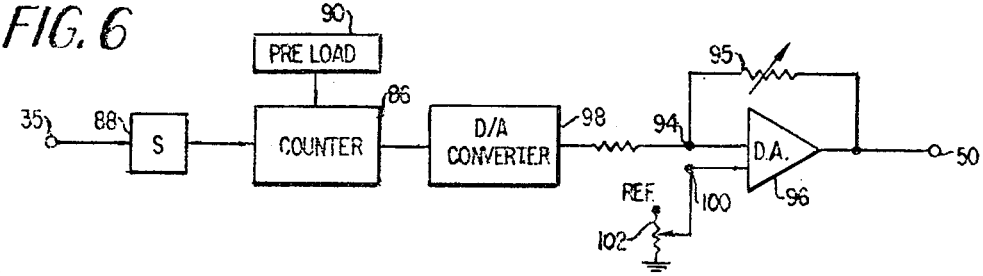
FIG. 6 is a functional block diagram of a second embodiment of the dynamic reference element of FIG. 3.

Another embodiment of the dynamic reference element 52 of the deformation computer 38 of the present invention is illustrated in FIG. 6. The flow related electrical signal is applied to a conventional counter, preferably a BCD serial counter, by way of a conventional scaler 88. A conventional pre-load circuit 90 may be connected to the counter 86 to provide for pre-loading any desired digital number into the counter 86.

The output signal from the counter 86 may be applied to a conventional digital-to-analog converter 92 and the output signal therefrom applied to an input terminal 94 of a conventional differential operational amplifier 96 by way of input resistor 98. An offset signal may be applied to a second input terminal 100 of the operational amplifier 96 from the arm of a reference potentiometer 102. The output signal from the operational amplifier 96 may be applied to the input terminal 50 of the differential amplifier 46 of FIG. 3 and may also be fed back to the input terminal 94 of the amplifier 96 by way of variable resistor or potentiometer 95.

In operation, the volume related signal from the flowmeter 30 is scaled, i.e. divided by an appropriate scaling factor, by the scaler 88 and applied to the counter 86. The counter 86 totalizes the volume of fluid being introduced into the vessel 20 and the digital signal therefrom is converted into an analog signal by the digital to analog converter 92. The analog signal representative of total volume is applied to the operational amplifier 96 where the amplitude and the offset of the volume related signal may be varied by respectively varying the potentiometers 95 and 102, to establish a zero output signal from the differential amplifier 46 of FIG. 3 in the elastic deformation region of the vessel 20 as previously described. The offset potentiometer 62 of FIG. 3 may thus be eliminated and a two input differential amplifier utilized to obtain the difference between the signal at terminal 50 related to ideal elastic deformation and the signal at terminal 44 related to actual deformation.

It is apparent from the above description that the system of the present invention provides extremely accurate and rapid determination of the "yield" properties of vessels in a relatively simple and inexpensive manner. The system lends itself to the complete automation of nondestructive vessel testing where yield strengths are desired with respect to any yield condition specified by the manufacturer or customer. Further, both the amount of vessel deformation and the deformation rate are continuously available as electrical signals which may be easily utilized with various output equipment, e.g. recorders, alarms and other suitable indicators and detectors, and which are therefore not subject to human error in the evaluation of the test.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A system for testing a closed vessel which deforms elastically until an elastic limit is reached and deforms plastically thereafter, said system comprising:
   conduit means for introducing a fluid into the vessel,
   flow monitoring means for generating a first electrical signal related to the volume of fluid introduced into the vessel;
   transducer means for generating a second electrical signal related to the pressure of the fluid within the vessel;
   deformation computing means responsive to said first electrical signal and to said second electrical signal for generating a third electrical signal representative of the amount of plastic deformation of the vessel; and,
   ratio computing means responsive to said first electrical signal and to said second electrical signal for generating a fourth electrical signal representative of the rate of change in fluid pressure with respect to the volume of fluid in the vessel.

2. The system of claim 1 wherein said vessel is a pipeline, wherein said fluid is substantially incompressible, and
   wherein said flow monitoring means includes flowmeter means disposed in said conduit means for generating a series of electrical pulses related in number to the volume of fluid introduced into said conduit means.

3. The system of claim 2 wherein said deformation computing means comprises:
   means for modifying said first electrical signal to provide an electrical reference signal representative of ideal elastic deformation of the vessel being tested; and,
   first comparing means for comparing said reference signal with said second electrical signal to generate said third electrical signal.

4. The system of claim 3 wherein said first comparing means includes a differential amplifier.

5. The system of claim 2 wherein said ratio computing means comprises second comparing means for comparing the values of said second electrical signal at the beginning and end of a time interval determined by said first electrical signal and for generating said fourth electrical signal responsively to the comparison.

6. The system of claim 5 wherein said second comparing means comprises:
   means responsive to said first electrical signal for establishing a time interval related to a predetermined change in the volume of the fluid within the vessel;
   means for sampling and holding the value of said second electrical signal at the beginning of said time interval;
   means for sampling and holding the value of said second electrical signal at the end of said time interval; and
   means for subtracting the value of said second electrical signal at the beginning of said time interval from the value of said second electrical signal at the end of said time interval.

7. The system of claim 6 wherein said deformation computing means comprises:
   means for modifying said first electrical signal to provide an electrical reference signal representative of ideal elastic deformation of the vessel being tested; and,
   first comparing means for comparing said reference signal with said second electrical signal to generate said third electrical signal.

8. Apparatus for testing a closed vessel of a material capable of undergoing elastic and plastic deformation, said apparatus comprising:
   means for introducing a fluid into the vessel to cause increasing deformation of the vessel;
   means for generating a first electrical signal related to the flow of fluid into said vessel;
   means for modifying said first electrical signal to provide a fluid volume related reference signal representative of ideal elastic deformation of the vessel being tested;
   means for generating a second electrical signal related to the actual deformation of the vessel; and,
   means for comparing said second electrical signal with the electrical signal representative of the ideal elastic deformation of the vessel to generate a third electrical signal representative of the amount of plastic deformation of the vessel.

9. The apparatus of claim 8 wherein said means for generating said first electrical signal includes flowmeter means for generating a series of electrical pulses related in number to the volume of fluid introduced into the vessel, and
   wherein said means for generating said second electrical signal includes pressure transducer means for generating an electrical signal related to the pressure exerted on the vessel by the enclosed fluid.

10. The apparatus of claim 9 wherein said means for modifying said first electrical signal comprises:
    means for totalizing the pulses of said series of electrical pulses to provide an electrical signal related to the volume of fluid in said vessel; and
    means for modifying said volume related electrical signal to provide a desired proportionality between said volume related electrical signal and said second electrical signal, whereby said third electrical signal is zero when the vessel is undergoing elastic deformation.

11. Apparatus for testing a closed vessel of a material capable of undergoing elastic and plastic deformation, said apparatus comprising:
    means for introducing a fluid into the vessel to cause increasing deformation of the vessel;

means for generating a first electrical signal related to the volume of fluid introduced into the vessel;

means for generating a second electrical signal related to the pressure of the fluid within the vessel; and, means for sampling said second electrical signal and for comparing the sampled values of said second electrical signal at the beginning and end of an interval determined by said first electrical signal whereby the change of pressure with respect to a change in volume is determined.

12. The apparatus of claim 11 wherein said first electrical signal is a series of electrical pulses related in number to the volume of fluid introduced into the vessel; and wherein said comparing means comprises:

means responsive to said first electrical signal for establishing a time interval related to a predetermined change in the volume of the fluid within the vessel;

means for sampling and holding the value of said second electrical signal at the beginning of said time interval;

means for sampling and holding the value of said second electrical signal at the end of said time interval; and, means for subtracting the value of said second electrical signal at the beginning of said time interval from the value of said second electrical signal at the end of said time interval.

13. The apparatus of claim 11 wherein said first electrical signal is a series of electrical pulses related in number to the volume of fluid introduced into the vessel and wherein said comparing means comprises:

means for sampling and holding the value of said second electrical signal in response to a first pulse in said first signal;

means for sampling and holding the value of the second electrical signal in response to a second pulse in said first signal;

said first and second pulses defining said time interval, and, means for subtracting the first sampled value of said second signal from the second sampled value of said second signal.

14. In the testing of a vessel which deforms elastically until an elastic limit point is reached and deforms plastically thereafter, a method for determining the yield strength of the vessel relative to a predetermined specified yield point beyond the elastic limit point of the vessel, said method comprising the steps of:

a. introducing a fluid into the vessel to cause increasing deformation thereof;

b. generating a first electrical signal related to the flow of fluid into the vessel;

c. modifying the first electrical signal to provide a fluid volume related reference signal representative of ideal elastic deformation of the vessel being tested;

d. generating a second electrical signal related to the actual deformation of the vessel;

e. comparing the second electrical signal with the electrical signal representative of the ideal elastic deformation of the vessel to thereby generate a third electrical signal representative of the amount of plastic deformation of the vessel; and, f. indicating the pressure within the vessel at the time and third electrical signal reaches a predetermined value representative of the predetermined specified yield point.

15. The method of claim 14 including the further step of interrupting the flow of fluid into the vessel when the third electrical signal reaches the predetermined value.

16. The method of claim 14 including the further steps of:

visually indicating the value of the third electrical signal; and, modifying the signal representative of ideal elastic deformation in response to the value of the third electrical signal to adjust the third electrical signal to a value of zero when the vessel is deforming elastically.

17. A method of determining a predetermined yield point for a vessel capable of elastic and plastic deformation comprising the steps of:

a. introducing fluid into the vessel;

b. generating a first electrical signal related to the pressure of the fluid within the vessel;

c. generating a second electrical signal related to the volume of fluid introduced into the vessel;

d. sampling the value of the first signal responsively to the second signal; and, e. generating a forth electrical signal related to the difference in value between successive samples of the first signal.

18. The method of claim 17 including the further steps of:

comparing the value of the fourth electrical signal with a signal related to the predetermined yield point; and, indicating the results of the comparison.

19. Apparatus for testing a closed vessel of a material capable of undergoing elastic and plastic deformation, said apparatus comprising:

means for introducing a fluid into the vessel to cause increasing deformation of the vessel;

fluid pressure sensing means for sensing the pressure of fluid within the closed vessel;

means responsive to said fluid introducing means and to said fluid pressure sensing means for determining the change of fluid pressure caused by an incremental introduction of a volume of fluid into the vessel at any point after the beginning of the test; and, means responsive to said determining means for providing an indication of said change of fluid pressure.

20. The apparatus of claim 19 wherein said determining means includes means for modifying the response of said determining means to one of said fluid introducing means and said pressure sensing means whereby said indication providing means provides a predetermined reference value when the vessel is undergoing elastic deformation.

21. The apparatus of claim 20 including reference means; and, means responsive to said reference means and to said indication providing means for indicating the transition of the vessel from elastic to plastic deformation.

22. In the testing of a vessel which deforms elastically until an elastic limit point is reached and deforms plastically thereafter, a method for determining the yield strength of the vessel relative to a predetermined specified yield point beyond the elastic limit point of the vessel, said method comprising the steps of:

a. introducing a fluid into the vessel to cause increasing deformation thereof;
b. sampling the pressure of the fluid within the vessel responsively to introduction of incremental volumes of fluid into the vessel;
c. determining from said pressure samples the change of fluid pressure with respect to the incremental change in the volume of fluid in the vessel; and,
d. displaying said change of fluid pressure.

23. The method of claim 22 including the step of modifying the display to a predetermined reference value while the vessel is undergoing elastic deformation.

24. A system for testing a closed vessel which deforms elastically until an elastic limit is reached and deforms plastically thereafter, said system comprising:
conduit means for introducing a fluid into the vessel;
flow monitoring means for generating a first signal related to the volume of fluid introduced into the vessel;
pressure monitoring means for generating a second signal related to the pressure of the fluid within the vessel;
means for modifying one of said first and second signals by a factor related to the ratio of changes in pressure to changes in volume while the vessel is undergoing elastic deformation;
deformation computing means responsive to the unmodified one of said first and second signals to the modified one of said first and second signals as modified for indicating the amount of plastic deformation of the vessel.

25. The system of claim 24 wherein said vessel is a pipeline,
wherein said fluid is substantially incompressible, and
wherein said deformation computing means compares said modified and said unmodified signals.

26. Apparatus for testing a closed vessel of a material capable of undergoing elastic and plastic deformation as a result of the introduction of fluid therein, said apparatus comprising:
means for providing a first signal related to the volume of fluid in the vessel being tested;
means for modifying said first signal to provide a fluid volume related reference signal representative of ideal pressure of the vessel being tested;
means for providing a second signal related to the actual pressure of the fluid within the vessel; and,
means for comparing said first and second signals to indicate the amount of plastic deformation of the vessel.

27. Apparatus for testing a closed vessel of a material capable of undergoing elastic and plastic deformation as a result of the introduction of fluid therein, said apparatus comprising:
means for generating a first signal related to the volume of fluid in the vessel;
means for generating a second signal related to the pressure of the fluid within the vessel; and,
means for sampling said second signal and for comparing the sampled values of said second signal at the beginning and end of a time interval determined by said first signal whereby the change in pressure of the fluid relative to reference value with respect to a change in the volume of the fluid relative to a reference value may be indicated.

28. The apparatus of claim 27 wherein said first signal is a series of electrical pulses related in number to the volume of fluid introduced into the vessel;
wherein said second signal is an electrical signal; and,
wherein said comparing means comprises:
means responsive to said first electrical signal for establishing a time interval related to a predetermined change in the volume of the fluid within the vessel;
means for sampling and holding the value of said second electrical signal at the beginning of said time interval;
means for sampling and holding the value of said second electrical signal at the end of said time interval; and,
means for subtracting the value of said second electrical signal at the beginning of said time interval from the value of said second electrical signal at the end of said time interval.

29. The apparatus of claim 27 wherein said first signal is a series of electrical pulses related in number to the volume of fluid introduced into the vessel;
wherein said second signal is an electrical signal; and,
wherein said comparing means comprises:
means for sampling and holding the value of said second electrical signal in response to a first pulse in said first signal;
means for sampling and holding the value of the second electrical signal in response to a second pulse in said first signal;
said first and second pulses defining said time interval; and,
means for subtracting the first sampled value of said second signal from the second sampled value of said second signal.

30. In the testing of a vessel which deforms elastically until an elastic limit point is reached and deforms plastically thereafter, a method for determining the yield strength of the vessel relative to a predetermined specified yield point beyond the elastic limit point of the vessel, said method comprising the steps of:
a. introducing a fluid into the vessel to cause increasing deformation thereof;
b. providing a first signal related to the volume of fluid in the vessel;
c. modifying the first signal to provide a fluid volume related reference signal representative of the ideal pressure of the fluid within the vessel being tested;
d. providing a second signal related to the actual pressure of the vessel; and,
e. comparing the second signal with the modified first signal to indicate the amount of plastic deformation of the vessel.

31. The method of claim 30 including the further step of indicating the pressure of the fluid within the vessel at the time the indication of the amount of plastic deformation reaches a predetermined value representative of the predetermined specified yield point.

* * * * *